(12) United States Patent
Yoshizumi

(10) Patent No.: US 10,108,913 B2
(45) Date of Patent: Oct. 23, 2018

(54) ITERATIVE PATTERN GENERATION ALGORITHM FOR PLATE DESIGN PROBLEMS

(71) Applicant: International Business Machines Corporation, Armonk, NY (US)

(72) Inventor: Takayuki Yoshizumi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/076,881

(22) Filed: Mar. 22, 2016

(65) Prior Publication Data

US 2016/0203423 A1 Jul. 14, 2016

Related U.S. Application Data

(63) Continuation of application No. 13/822,067, filed as application No. PCT/JP2011/070842 on Sep. 13, 2011.

(30) Foreign Application Priority Data

Sep. 28, 2010 (JP) ................. 2010-217805

(51) Int. Cl.
*G06F 19/00* (2018.01)
*G05B 19/00* (2006.01)
(Continued)

(52) U.S. Cl.
CPC .......... *G06Q 10/043* (2013.01); *B21B 37/00* (2013.01); *G05B 19/4097* (2013.01);
(Continued)

(58) Field of Classification Search
CPC .......... G06Q 10/043; G06Q 10/06315; G06Q 10/06313; B21B 37/00; G05B 19/4097; G05B 2219/35162
(Continued)

(56) References Cited

U.S. PATENT DOCUMENTS 3,663,383 A 5/1972 Matsuda et al.
3,698,622 A 10/1972 Krakow et al.
(Continued)

FOREIGN PATENT DOCUMENTS

JP 7-28867 A 1/1995
JP 8-106477 A 4/1996
(Continued)

OTHER PUBLICATIONS

Dash et al., "Production Design for Plate Products in the Steel Industry", 2007, IBM, vol. 51, No. 3/4/ May/Jul.; pp. 345-362. (Year: 2007).*
(Continued)

*Primary Examiner* — Michael J Brown
(74) *Attorney, Agent, or Firm* — Scully, Scott, Murphy & Presser, P.C.; David Quinn, Esq.

(57) ABSTRACT

A method to generate a plurality of groups each including at least one of a plurality of elements. The method includes selecting at least one candidate element from the plurality of elements as a candidate to be included in a group, determining whether or not to generate the group including the at least one candidate element selected in the selecting step, based on an element evaluation value associated with each of the at least one candidate element selected in the selecting step, provided that a determination is made to generate the group in the determining step, generating the group including the at least one candidate element selected in the selecting step, and weighting the element evaluation value
(Continued)

of each of the at least one element according to how many times the each element is included in already-generated groups to reflect the weighted element evaluation value in next group generation.

19 Claims, 11 Drawing Sheets

(51) Int. Cl.
  *G06Q 10/04* (2012.01)
  *B21B 37/00* (2006.01)
  *G06Q 10/06* (2012.01)
  *G05B 19/4097* (2006.01)
(52) U.S. Cl.
  CPC . *G06Q 10/06313* (2013.01); *G06Q 10/06315* (2013.01); *G05B 2219/35162* (2013.01)
(58) Field of Classification Search
  USPC .......................... 703/21; 700/145, 178, 182
  See application file for complete search history.

(56) References Cited

U.S. PATENT DOCUMENTS

| | | | |
|---|---|---|---|
| 3,871,896 | A | 3/1975 | Marsudaira et al. |
| 3,934,527 | A | 1/1976 | Saunders |
| 4,551,810 | A | 11/1985 | Levine |
| 5,300,809 | A | 4/1994 | Nakamura et al. |
| 5,479,361 | A | 12/1995 | Kurtzberg et al. |
| 5,623,425 | A | 4/1997 | Yoda |
| 5,999,923 | A | 12/1999 | Kowalski et al. |
| 6,065,857 | A | 5/2000 | Hazama et al. |
| 6,327,514 | B1 | 12/2001 | Hazama et al. |
| 6,622,061 | B1 | 9/2003 | Toprac et al. |
| 6,912,436 | B1 | 6/2005 | Jones et al. |
| 7,043,318 | B1 | 5/2006 | Barto et al. |
| 7,054,702 | B1 | 5/2006 | Barto et al. |
| 7,100,839 | B2 | 9/2006 | Farina et al. |
| 7,174,230 | B2 | 2/2007 | Arachaparambil et al. |
| 7,181,354 | B1 | 2/2007 | Bone et al. |
| 7,239,977 | B2 | 7/2007 | Fantana et al. |
| 7,242,991 | B2 | 7/2007 | Budinger et al. |
| 7,349,753 | B2 | 3/2008 | Paik |
| 7,509,337 | B2 | 3/2009 | Chitgupakar et al. |
| 7,912,561 | B2 | 3/2011 | Hsiung et al. |
| 8,589,121 | B2 | 11/2013 | Uenishi et al. |
| 2001/0018644 | A1 | 8/2001 | Schwalb et al. |
| 2001/0039918 | A1 | 11/2001 | Tracy et al. |
| 2002/0107599 | A1 | 8/2002 | Patel et al. |
| 2003/0109950 | A1 | 6/2003 | Andrade, Jr. et al. |
| 2003/0204279 | A1 | 10/2003 | Yorkohari et al. |
| 2003/0220707 | A1 | 11/2003 | Budinger et al. |
| 2005/0021273 | A1 | 1/2005 | Dorough et al. |
| 2005/0090911 | A1 | 4/2005 | Ingargiola et al. |
| 2006/0085155 | A1 | 4/2006 | Miguelanez et al. |
| 2006/0100838 | A1 | 5/2006 | Dunnill et al. |
| 2006/0271226 | A1 | 11/2006 | Tasaki et al. |
| 2007/0016542 | A1 | 1/2007 | Rosauer et al. |
| 2007/0028219 | A1 | 2/2007 | Miller et al. |
| 2007/0100565 | A1 | 5/2007 | Gosse et al. |
| 2007/0143038 | A1 | 6/2007 | Yuan et al. |
| 2007/0239310 | A1 | 10/2007 | Fan |
| 2008/0015720 | A1 | 1/2008 | Oyasato et al. |
| 2008/0221721 | A1 | 9/2008 | Reed et al. |
| 2008/0275586 | A1 | 11/2008 | Ko et al. |
| 2009/0228129 | A1 | 9/2009 | Moyne et al. |
| 2009/0319060 | A1* | 12/2009 | Wojsznis ............... G05B 11/42 700/30 |
| 2011/0153051 | A1 | 6/2011 | Bachman et al. |

FOREIGN PATENT DOCUMENTS

| | | |
|---|---|---|
| JP | 1998-040270 A | 2/1998 |
| JP | 11-39358 A | 2/1999 |
| JP | 2001-101253 A | 4/2001 |
| JP | 2001-184112 A | 7/2001 |
| JP | 2002-304426 A | 10/2002 |
| JP | 2004-326268 A | 11/2004 |
| JP | 2004-334831 A | 11/2004 |
| JP | 2006-221564 A | 8/2006 |
| JP | 2007-137612 A | 6/2007 |
| JP | 2008-310698 A | 12/2008 |
| JP | 2009-251683 A | 10/2009 |
| JP | 2010-86235 A | 4/2010 |

OTHER PUBLICATIONS

An Office Action dated Mar. 31, 2016, received in a related U.S. Appl. No. 13/822,067, 7 pages.
Notice of Allowance dated Aug. 23, 2016, received in a related U.S. Appl. No. 13/822,067, 8 pages.
IBM, "Identifying your needs", 2006, 2 pages.
Dash et al., "Production Design for Plate Products in the Steel Industry", May 2007, IBM Journal of Research and Development (vol. 51), pp. 345-362.

* cited by examiner

FIG. 6

ITERATIVE PATTERN GENERATION ALGORITHM FOR PLATE DESIGN PROBLEMS

CROSS-REFERENCE TO RELATED APPLICATION

This application is a continuation of U.S. patent application Ser. No. 13/822,067, filed May 8, 2013 which is the National Phase Application based on PCT/JP2011/070842 filed Sep. 13, 2011 which claims priority from Japanese Patent Application No. 2010-217805 filed Sep. 28, 2010, the entire contents of both of which are incorporated herein by reference.

BACKGROUND OF THE INVENTION

Field of the Invention

The present invention relates to a method, program, and apparatus for grouping a plurality of elements.

Description of Related Art

In a steel plant, flat steel plates of various sizes are manufactured to order and shipped out. To manufacture flat steel plates, first, a lengthy large steel plate (a large plate) is manufactured through a rolling process. Next, the large plate is cut into multiple steel plates (small plates) of various sizes ordered. Then, the small plates thus cut are examined and shipped out as products.

In cutting out small plates of various sizes from a large plate, some layout of cutting positions produces a large useless area which cannot be used as products, and therefore lowers yield. Accordingly, in a steel plant, in cutting out small plates of various sizes from a large plate, a computer is used to calculate a layout offering good utilization efficiency, so that yield can be improved. To calculate an efficient layout for cutting a large plate into small plates of various sizes is called a plate design problem.

Japanese Patent Application Publication No. 2009-251683 describes an assignment plan making method for making a plan for assigning multiple orders of shaped steel products different in size and amount to multiple pre- or post-rolled materials of various sizes. More specifically, Japanese Patent Application Publication No. 2009-251683 describes an assignment plan making method comprising: a grouping step for classifying materials into multiple groups according to size; a pattern creating step for obtaining multiple patterns assignable to one piece of material according to the sizes of orders under predetermined patterning conditions; and a pattern selecting step for selecting patterns necessary for the assignment to the material by obtaining allocation of the patterns to the group according to at least an evaluation function indicating a score of material yield.

Japanese Patent Application Publication No. 2001-184112 describes a method for automatically making a cutting plan of parts, the method making a layout of the parts on a plate material based on data on the parts and data on the plate material. More specifically, Japanese Patent Application Publication No. 2001-184112 describes a method for automatically making a cutting plan of parts, which comprises the steps of: determining the yield of each plate material on which parts are laid out; and editing the parts laid out on a plate material having yield equal to or less than a specified amount to locate the parts at a predetermined position on the plate material.

Japanese Patent Application Publication No. 2007-137612 describes a method for planning division of multiple steel materials in a steel-material yard, the method dividing multiple target steel materials waiting to be supplied to the next step in a steel process or waiting to be shipped, into multiple mounds of steel materials based on predetermined mounding constraints. More specifically, Japanese Patent Application Publication No. 2007-137612 describes a method for planning division of steel materials, the method including: generating a set of feasible mounds which are subsets of the target steel materials; setting a constraint (set division constraint) used for obtaining such combinations of feasible mounds from the set of feasible mounds that each combination includes all the target steel materials without duplication; and figuring out a combination of feasible mounds which optimizes an evaluation function based on the group division constraint.

SUMMARY OF THE INVENTION

In one embodiment, a computer-implemented method for generating a plurality of groups, each including at least one of a plurality of elements is provided. The method includes selecting, by the computer, at least one candidate element from the plurality of elements as a candidate to be included in a group, determining, by the computer, whether or not to generate the group including the at least one candidate element selected in the selecting step, based on an element evaluation value associated with each of the at least one candidate element selected in the selecting step, provided that a determination is made to generate the group in the determining step, generating, by the computer, the group including the at least one candidate element selected in the selecting step, and weighting, by the computer, the element evaluation value of each of the at least one element according to how many times the each element is included in already-generated groups, so as to reflect the weighted element evaluation value in next group generation.

According to another embodiment, a computer readable storage medium tangibly embodying a computer readable program code having computer readable instructions which, when implemented, cause a computer to carry out the steps of a method. The method includes selecting, by the computer, at least one candidate element from the plurality of elements as a candidate to be included in a group, determining, by the computer, whether or not to generate the group including the at least one candidate element selected in the selecting step, based on an element evaluation value associated with each of the at least one candidate element selected in the selecting step, provided that a determination is made to generate the group in the determining step, generating, by the computer, the group including the at least one candidate element selected in the selecting step, and weighting, by the computer, the element evaluation value of each of the at least one element according to how many times the each element is included in already-generated groups, so as to reflect the weighted element evaluation value in next group generation.

According to another embodiment, an apparatus for generating a plurality of groups each including at least one of a plurality of elements is provided. The apparatus includes an element selector configured to select at least one candidate element from the plurality of elements as a candidate to be included in a group, a determination unit configured to determine whether or not to generate the group including the at least one candidate element selected by the element selector, based on each element evaluation value associated with the at least one candidate element selected by the element selector, a group generator configured to generate the group including the at least one candidate element selected by the element selector, provided that the determination unit makes a determination to generate the group, and a weighting unit configured to weight the element evaluation value of each of the at least one element according to how many times the each element is included in the already-generated groups, so as to reflect the weighted element evaluation value in next group generation.

BRIEF DESCRIPTION OF THE DRAWINGS

FIG. 6 shows element evaluation values g(i) for evaluating corresponding product plates.

Figure 10:
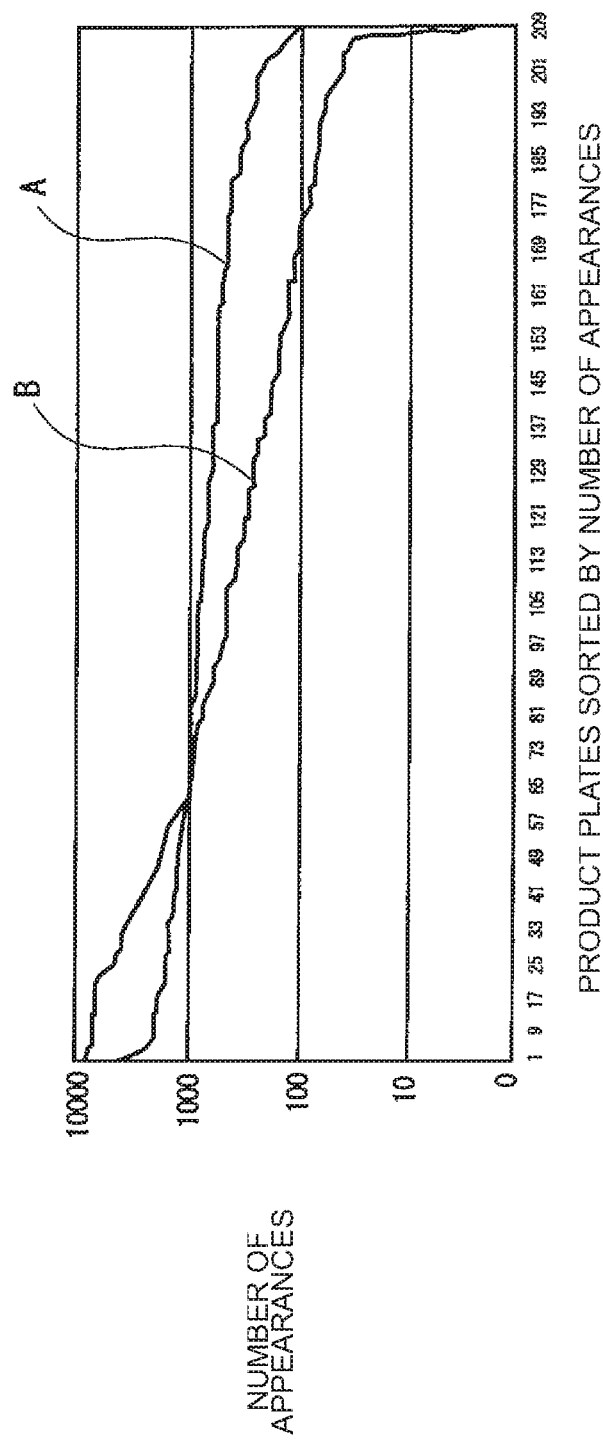

A in FIG. 10 shows an example of a graph line representing the number of appearances of each product plate, sorted by its number of appearances, after completion of the n-th update in a case where the element evaluation values are not updated; B in FIG. 10 shows an example of a graph line representing the number of appearances of each product plate, sorted by its number of appearances, after completion of the n-th update in a case where the element evaluation values are updated.

Figure 11:
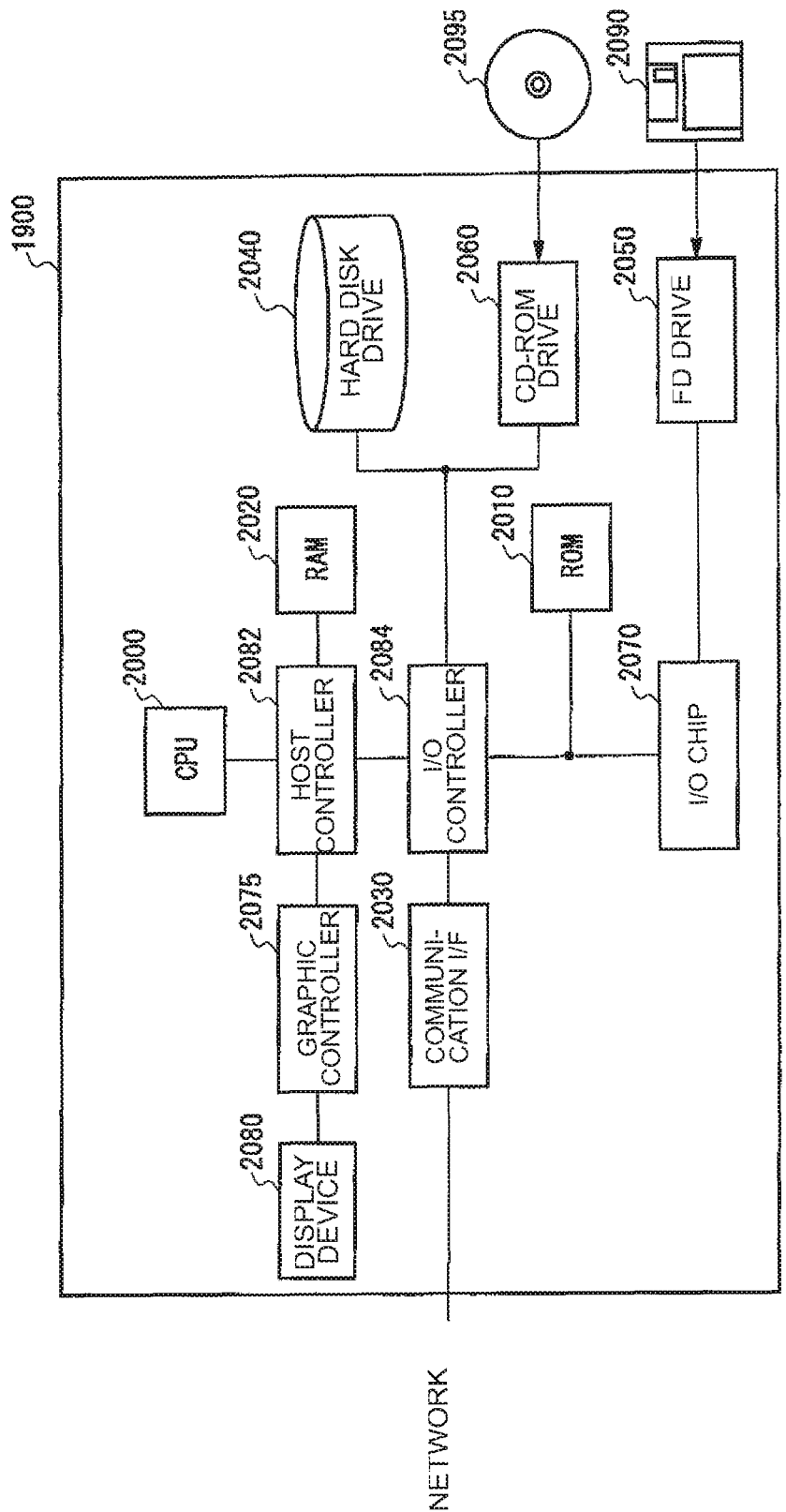

FIG. 11 shows an example of the hardware configuration of a computer 1900 according to the embodiment.

DETAILED DESCRIPTION OF THE PREFERRED EMBODIMENTS

The steel plates are ordered in various sizes. For this reason, ordered steel plates can include one with an atypical size, such as extremely smaller than or extremely narrower and longer than an average size of steel plates. When steel plates to be manufactured have such various sizes, it is very difficult to calculate a layout for efficiently cutting out multiple small plates from a large plate.

In addition, there is also a case where multiple elements of various sizes, not limited to steel plates, are divided into groups according to a predetermined condition. In such a case, when the multiple elements include elements of atypical sizes, it is very difficult to divide the multiple elements into groups while satisfying the predetermined condition.

In order to solve the above problem, a first embodiment of the present invention provides a method for causing a computer to generate a plurality of groups each including at least one of a plurality of elements. The method comprising the steps of: selecting, by the computer, at least one candidate element from the plurality of elements as a candidate to be included in a group; determining, by the computer, whether or not to generate the group including the at least one candidate element selected in the selecting step, based on an element evaluation value associated with each of the at least one candidate element selected in the selecting step; provided that a determination is made to generate the group in the determining step, generating, by the computer, the group including the at least one candidate element selected in the selecting step; and weighting, by the computer, the element evaluation value of each of the at least one element according to how many times the each element is included in already-generated groups, so as to reflect the weighted element evaluation value in next group generation. An apparatus and a program are also provided.

Note that the above-described summary of the invention does not list all the requisite characteristics of the present invention. Moreover, sub-combinations of these characteristic groups can also be the invention.

The present invention is described below through an embodiment of the invention. However, the embodiment given below does not limit the invention according to the scope of claims. Further, not all combinations of characteristics described in the embodiment are always requisite for the solving means of the invention.

Figure 1:
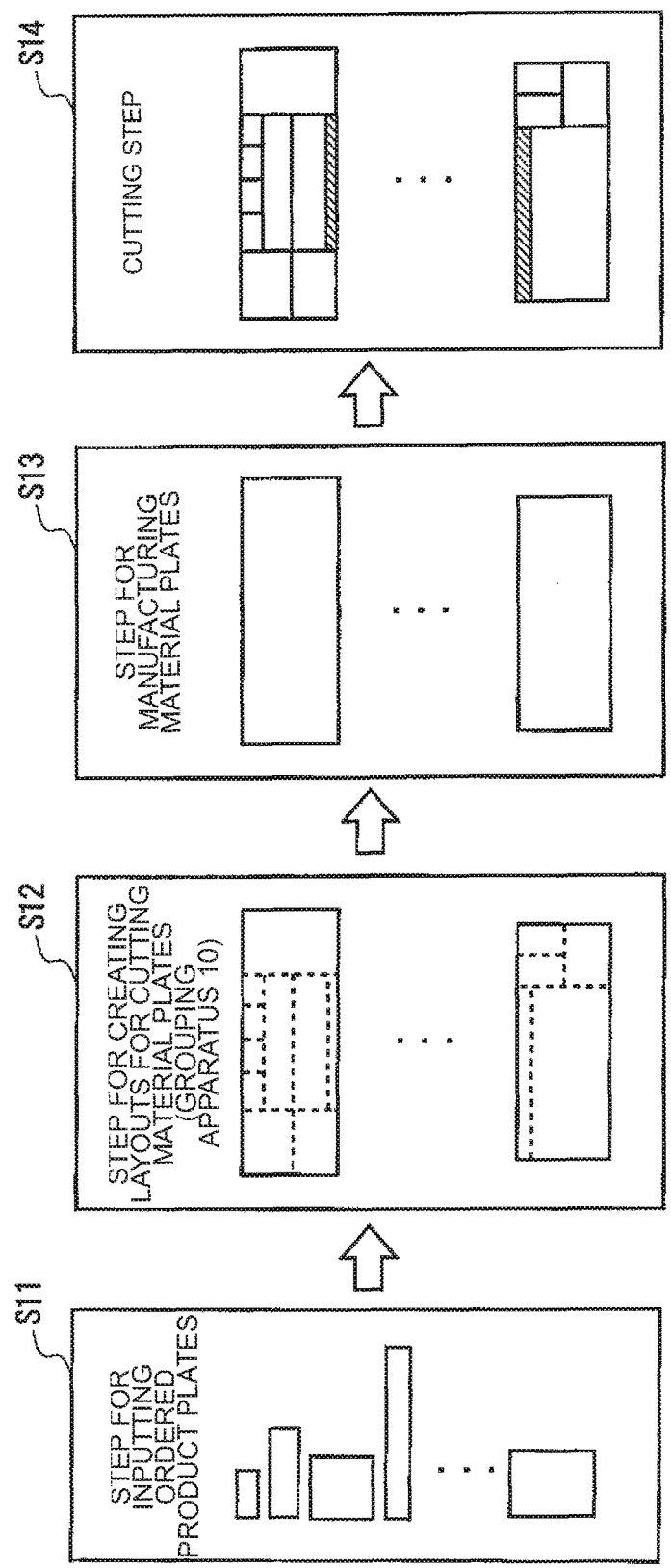
FIG. 1 shows a flow of manufacturing steel plates (product plates) according to an embodiment.

FIG. 1 shows a flow of manufacturing steel plates (product plates) according to the embodiment. A steel plant manufactures flat steel plates having a rectangular shape in a plan view, according to orders from customers. Note that the steel plates having a rectangular shape in a plan view which are manufactured according to orders from customers are called product plates herein.

To manufacture product plates, first, the planar size (the lateral width and vertical width) of a product plate ordered is inputted to a computer (S11). Next, when orders of product plates reach or exceed a predetermined number, multiple layout patterns are created by use of the computer (S12). Each layout pattern indicates positions at which multiple product plates ordered are to be cut out from one of lengthy steel plates manufactured through rolling. Note that the lengthy steel plates manufactured through rolling are called material plates herein.

Then, in a steel plant, multiple material plates of sizes indicated by the multiple layout patterns created are manufactured through rolling (S13). Subsequently, in the steel plant, each of the material plates is cut according to its corresponding layout pattern (S14). Thereby, multiple product plates of ordered sizes can be manufactured in the steel plant.

The layout creation processing in Step S12 is executed by a grouping apparatus 10 according to the embodiment. The grouping apparatus 10 is implemented by a computer.

The grouping apparatus 10 is configured to group multiple elements without duplication so that multiple elements of various sizes can all fit into multiple predetermined set sizes. In this example, in order to cut out multiple product plates, which are rectangular elements, from material plates having rectangular set shapes, the grouping apparatus 10 lays out the multiple product plates so that all of them can fit into the multiple set shapes without duplication.

Note that the grouping apparatus 10 can be configured to lay out multiple elements having other shapes than those of the product plates so that they can be fit into the set shapes. As an example, the grouping apparatus 10 can group and lay out multiple elements having various two-dimensional shapes or three-dimensional shapes so that all of them can fit into multiple predetermined set shapes (of, for example, two dimensional shapes or three-dimensional shapes) without duplication.

Figure 2:
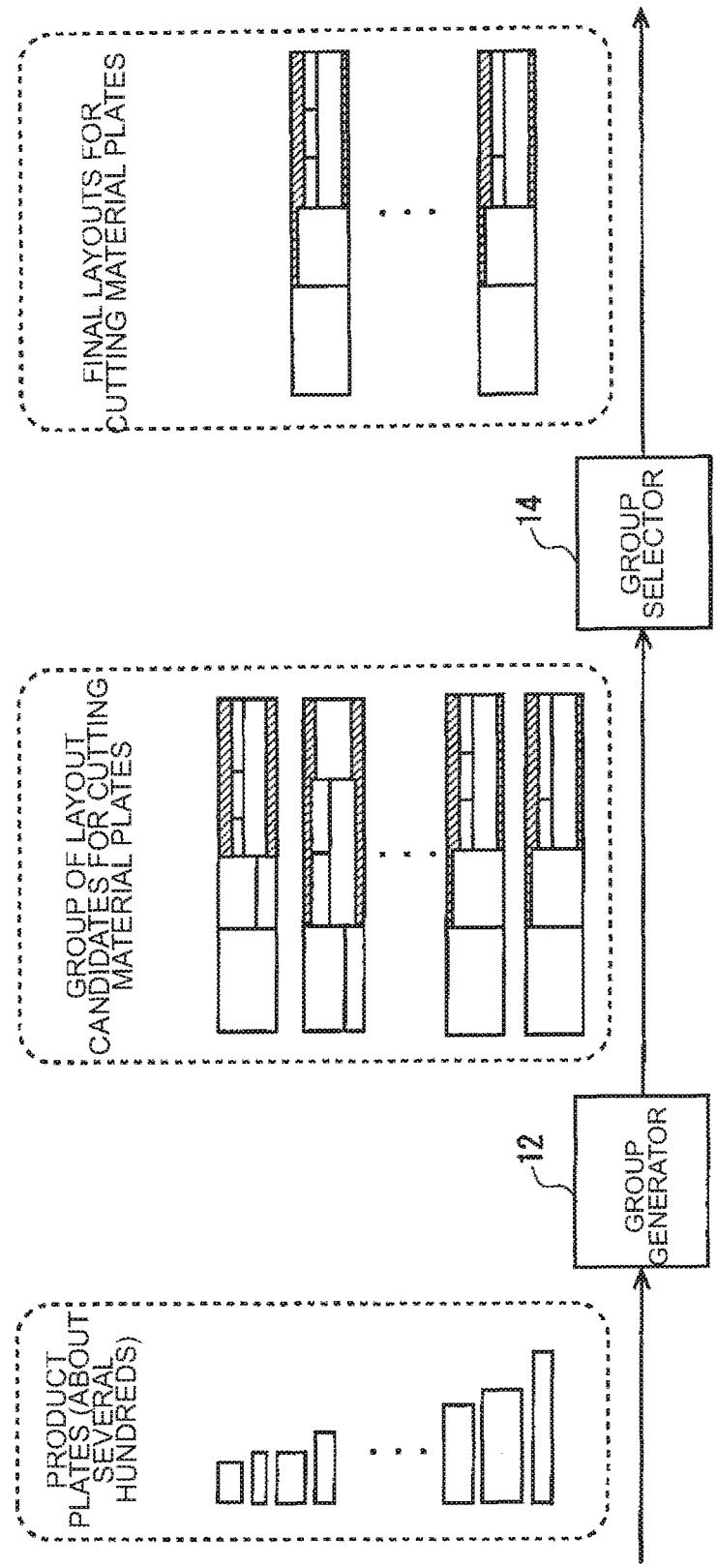
FIG. 2 shows the functional configuration of a grouping apparatus 10 according to the embodiment.

FIG. 2 shows the functional configuration of the grouping apparatus 10 of the embodiment. The grouping apparatus 10 according to the embodiment includes a group generator 12 and a group selector 14.

The group generator 12 receives multiple elements of various sizes. In this example, the group generator 12 receives shapes of product plates having various planar sizes (lateral and vertical widths). The group generator 12 receives shapes of, for example, several hundred product plates.

The group generator 12 generates multiple groups each including at least one of the multiple elements received. As an example, the group generator 12 generates multiple group candidates each formed by combining at least one element so that the combined size can fit into a predetermined set size. In this processing, the group generator 12 generates multiple groups, while allowing two or more groups to include the same element duplicately.

In this example, the group generator 12 generates a group of multiple candidate layout patterns each formed by combining the shape of at least one product plate together and used for cutting out the at least one product plate from a material plate. As an example, the group generator 12 generates the layout patterns by combining at least one product plate randomly or according to a predetermined condition, so that the combined shape can fit into the shape of the material plate (the set shape). Note that, for example, the set shape which is the shape of the material plate can be modifiable within a certain range. Further, the group generator 12 generates multiple layout patterns, while allowing two or more layout patterns to include the same product plate duplicately.

As an example in the case of receiving elements (e.g., several hundreds), the group generator 12 generates groups (e.g., layout patterns) of 100 times (e.g., several tens of thousands), or more preferably 200 times or more, the number of elements received. Moreover, as an example, the group generator 12 sets the upper limit of groups (e.g., layout patterns) to generate to 1000 times or less, or more preferably 400 times or less, or still more preferably 300 times or less, the number of received elements.

The group selector 14 selects multiple groups including all the multiple elements without duplication, from the multiple group candidates generated by the group generator 12. In this processing, the group generator 14 selects multiple groups which minimize the total of the set sizes used for combining elements to be included in a group.

In this example, the group selector 14 selects, from the multiple layout pattern candidates generated by the grouping generator 12, multiple layout patterns including all the multiple product plates without duplication. In this processing, the group generator 14 selects multiple layout patterns which minimize the total of the sizes of the material plates.

As an example, the group selector 14 uses integer programming to select multiple groups (e.g., layout patterns) including all the multiple elements (e.g., multiple product plates) without duplication. Note that the minimized total of the set sizes (e.g., the total of the sizes of the material plates) obtained by the group selector 14 does not have to actually be minimum. In other words, the group selector 14 only has to select multiple groups (e.g., multiple layout patterns) based on an algorithm which gives a higher score to a solution of a smaller total of set sizes.

Figure 3:
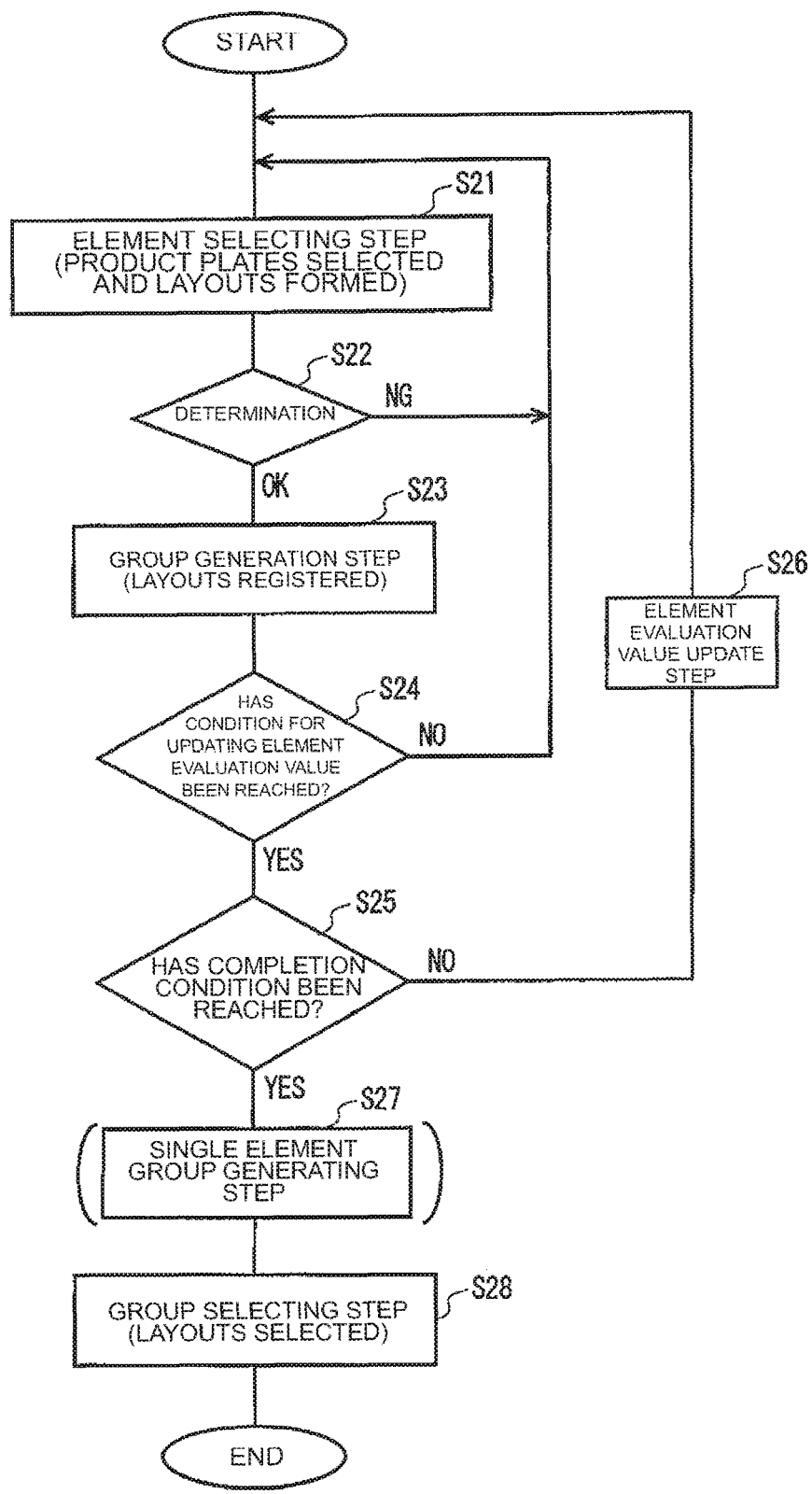
FIG. 3 shows a processing flow of the grouping apparatus 10 according to the embodiment.

FIG. 3 shows a processing flow executed by the grouping apparatus 10 according to the embodiment. The grouping apparatus 10 executes the processing of Steps S21 to S28 shown in FIG. 3. Processing in Steps S21 to S27 corresponds to processing executed by the group generator 12. Processing in Step S28 corresponds to processing executed by the group selector 14.

First, in Step S21, the grouping apparatus 10 selects, from multiple elements of various sizes, at least one candidate element which is a candidate to be included in a group. In this processing, the grouping apparatus 10 selects the at least one candidate element from the multiple elements so that the combined size of the at least one element can fit into a predetermined set size.

Further, in this processing, the grouping apparatus 10 selects the at least one candidate element to be included in a group from the multiple elements, while allowing the same element as one included in an already-generated group to be selected duplicately. Note that, when the set size is changeable within a predetermined limit, the grouping apparatus 10 changes the set size within the predetermined limit, and selects the at least one candidate element so that the combined size can fit into the set size.

In this example, in Step S21, the grouping apparatus 10 selects, from multiple product plates, at least one candidate product plate which is a candidate to be included in a layout pattern. In this processing, the grouping apparatus 10 selects at least one product plate from multiple product plates so that the combined shape of the at least one product plate can fit into the predetermined set shape of the material plate. Further, in this processing, the grouping apparatus 10 selects, from multiple product plates, at least one product plate to be included in one layout pattern, while allowing the same product plate as one included in an already-generated group to be selected duplicately.

Next, in Step S22, the grouping apparatus 10 determines whether to generate the group including the selected at least one candidate element or not, based on an element evaluation value of each of the at least one candidate element selected in the element selecting stage (S21) and also based on a group evaluation value of the group including the at least one candidate element. In this example, in Step S22, the grouping apparatus 10 determines whether or not to generate the layout pattern based on the element evaluation value of each of the at least one candidate product plate selected and also based on the group evaluation value of the layout pattern including the at least one candidate product plate. A detailed description of the element evaluation value and the group evaluation value will be given later.

When a determination is made not to generate the group (NG in S22), the grouping apparatus 10 proceeds back to the processing in Step S21 to perform the processing for the next group. When a determination is made to generate the group (OK in S22), the grouping apparatus 10 proceeds to Step S23.

Subsequently, in Step S23, provided that a determination is made to generate the group in the determining stage (S22), the grouping apparatus 10 generates the group including the at least one candidate element selected in the element selecting stage (S21). In this example, in Step S23, provided that a determination is made to generate the layout pattern, the grouping apparatus 10 registers, in a server for example, the layout pattern including the at least one candidate product plate selected in the element selecting stage (S21).

Next, in Step S24, the grouping apparatus 10 determines whether a condition for updating the element evaluation values has been satisfied or not. For example, the grouping apparatus 10 determines that the condition for updating the element evaluation values has been satisfied when a predetermined number of groups are generated using the current element evaluation values (e.g., when a thousand groups are generated).

When the condition for updating the element evaluation value has not been satisfied (NO in S24), the grouping apparatus 10 proceeds back to Step S21 to perform processing for the next group. When the condition for updating the element evaluation value has been satisfied (YES in S24), the grouping apparatus 10 proceeds to Step S25.

Next, in Step S25, the grouping apparatus 10 determines whether a condition for terminating the group generation processing has been satisfied or not. For example, the grouping apparatus 10 determines that the termination condition has been satisfied when a processing time reaches a preset time or when a preset number of groups are generated (e.g., when several tens of thousands of groups are generated).

When the termination condition has not been satisfied (NO in S25), the grouping apparatus 10 proceeds to Step S26. When the termination condition has been satisfied (YES in S25), the grouping apparatus 10 proceeds to Step S27.

Next, in Step S26, the grouping apparatus 10 weights the element evaluation value of each of the at least one element according to how many times the each element is included in the generated group, and reflects the weighted element evaluation value in the next group generation. In this case, for example, the grouping apparatus 10 updates the element evaluation value of each of the at least one element to a smaller value when the each element is included in a larger number of the multiple already-generated groups. In this example, in Step S26, the grouping apparatus 10 updates the element evaluation value of each of the at least one product plate according to how many times the each product plate is included in the already-generated layout patterns, and reflects the updated element evaluation element in the next layout pattern generation.

A detailed description of how to update the element evaluation value will be given later. After completing Step S26, the grouping apparatus 10 proceeds back to Step S21 to perform processing for the next group.

Next, in Step S27, for each of at least part of the multiple elements, the grouping apparatus 10 generates a group including only the each element. In this processing, for each of all the multiple elements, the grouping apparatus 10 generates a group including only the each element and excluding all the other elements. In this example, as an example, for each of all the multiple product plates, the grouping apparatus 10 registers, in a server for example, a layout pattern including the each product plate and excluding all the other product plates. Note that the grouping apparatus 10 can be configured not to execute Step S27.

Next, in Step S28, from the multiple groups generated in the group generating stage (S23) and in the single element generating stage (S27), the grouping apparatus 10 selects multiple groups which include all the multiple elements without duplication and minimize the total of the set sizes used in the candidate element selection. In this example, in Step S28, from the multiple layout patterns generated, the grouping apparatus 10 selects multiple layout patterns which include all the multiple product plates without duplication and minimize the total of the set shapes (the sizes of the material plates) used in the candidate product plate selection.

The grouping apparatus 10 configured as such can easily generate multiple groups including multiple elements of various sizes without duplication. In this example, for example, the grouping apparatus 10 can easily generate layout patterns with which multiple product plates including specially-sized ones can be cut out efficiently from multiple material plates.

Figure 4:
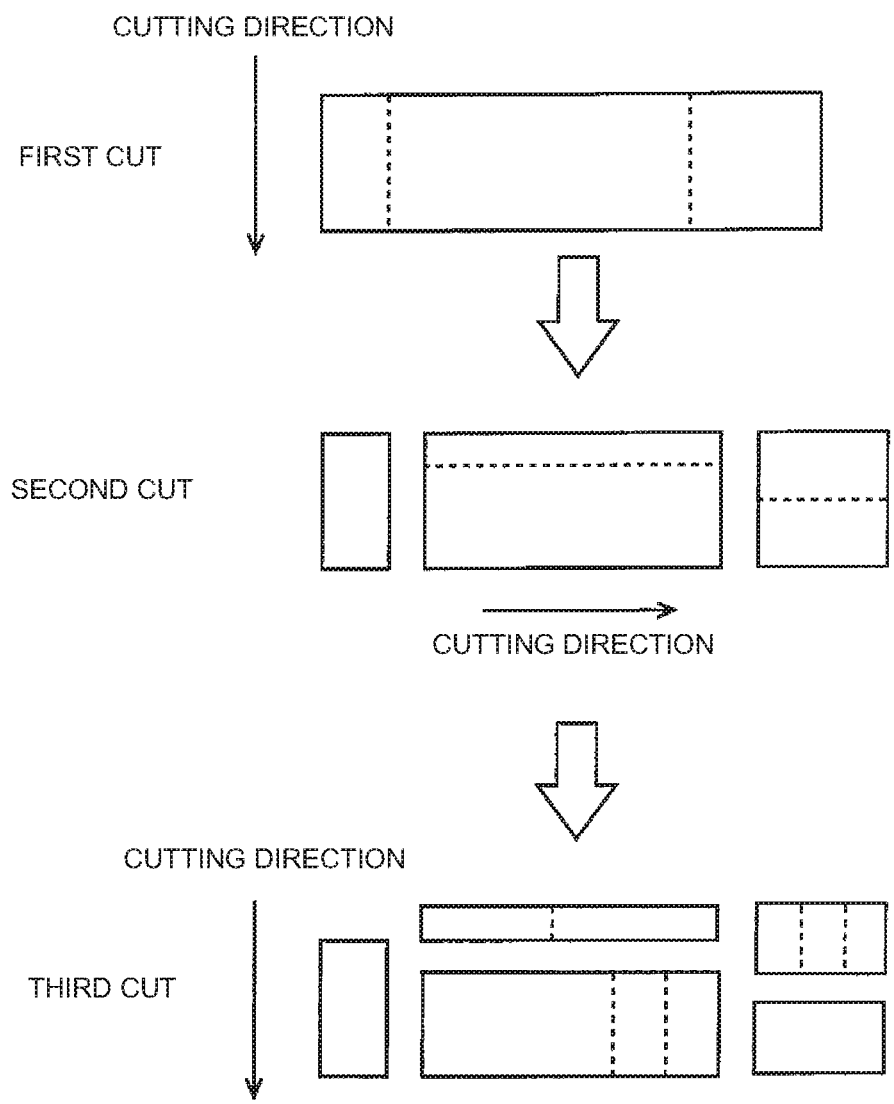
FIG. 4 shows an example of a procedure for cutting out product plates from a material plate in the embodiment.

FIG. 4 shows an example of a procedure of cutting out product plates from a material plate in the embodiment. In a steel plant, multiple product plates are cut out from a rolled lengthy material plate according to a predetermined procedure. In this example, first, in a first cutting process, the material plate is cut in its short-side direction. Next, in a second cutting process, the material plate is cut in its long-side direction. Then, in a third cutting process, the material plate is cut in the short-side direction.

Figure 5:
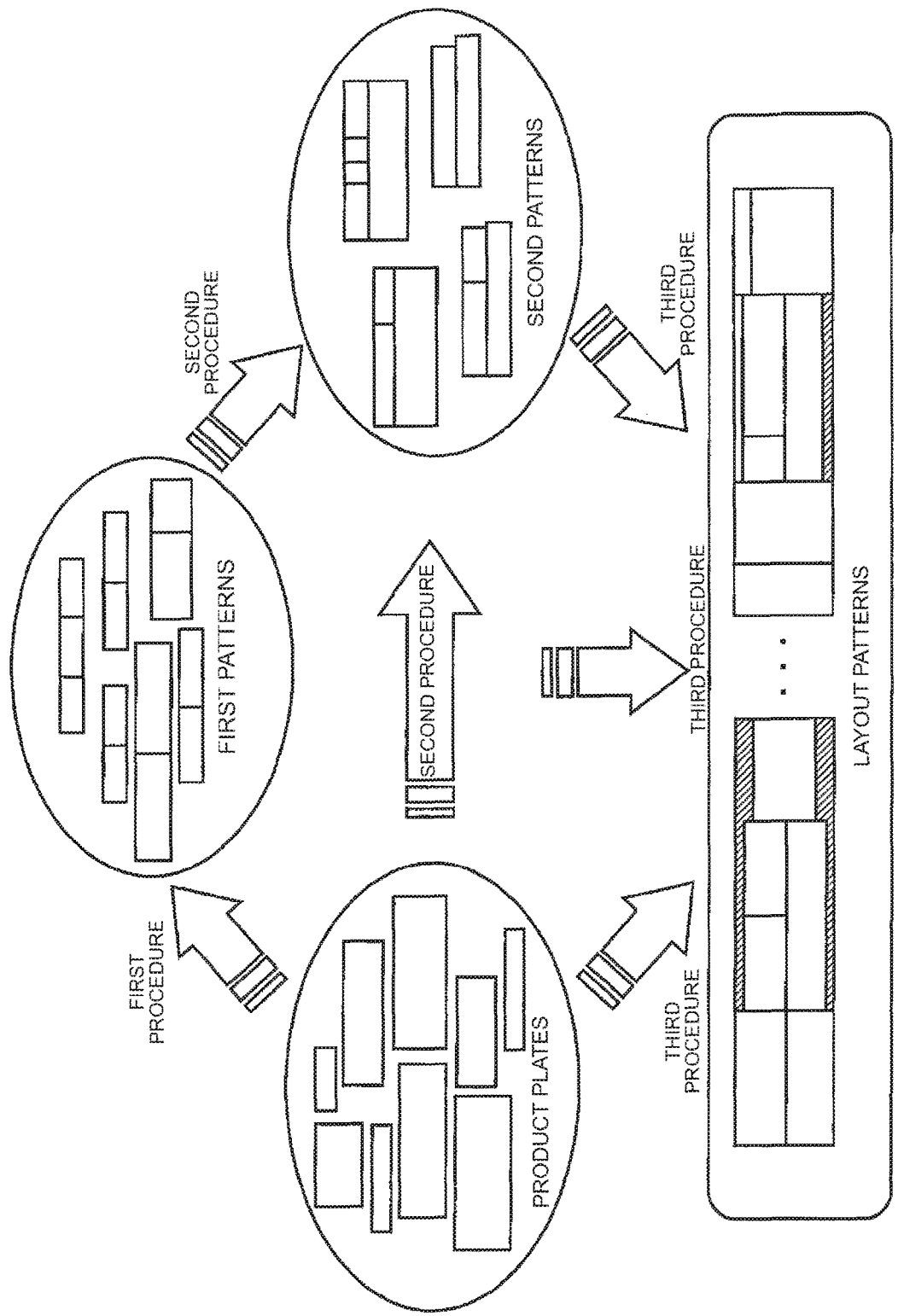
FIG. 5 shows a method for generating layout patterns each indicating positions at which product plates are cut out from a material plate, the method performed by the grouping apparatus 10 according to the embodiment.

FIG. 5 shows how the grouping apparatus 10 according to the embodiment generates layout patterns each showing cutting positions at which product plates are cut out from a material plate. In generating one layout pattern by combining multiple product plates, the grouping apparatus 10 generates the layout pattern by connecting the multiple product plates according to a reverse procedure to the procedure for cutting out the product plates from the material plate. Thus, the grouping apparatus 10 can generate a layout pattern with which the cutting processes are actually possible in a steel plant.

In this example, in a first procedure for connecting multiple product plates together, the grouping apparatus 10 selects any two or more pieces out of the multiple product plates. Then, the grouping apparatus 10 generates multiple first patterns by connecting the selected two or more pieces to each other along their first direction (e.g., lateral direction) which is any one of the sides of each product plate.

Next, in a second procedure, the grouping apparatus 10 selects any two or more pieces out of the multiple product plate pieces and the multiple first patterns. Then, the grouping apparatus 10 generates multiple second patterns by connecting the selected two or more pieces to each other along their second direction (e.g., vertical direction) which is perpendicular to the first direction.

Next, in a third procedure, the grouping apparatus 10 selects any two or more pieces out of the multiple product plate pieces, the multiple first patterns, and the multiple second patterns. Then, the grouping apparatus 10 generates multiple layout patterns by connecting the selected two or more pieces along the first direction.

Note that, in any of the first procedure, the second procedure, and the third procedure, the grouping apparatus 10 generates the patterns so that the combined shape after connecting the pieces can fit into the set shape of the material plate. In this processing, the set shape of the material plate can be, for example, changeable within a predetermined range in the long-side direction.

Then, the grouping apparatus 10 determines whether or not to register each of the layout patterns thus generated, based on a formula using the element evaluation values which evaluate the respective product plates included in the layout pattern and the group evaluation value which evaluates the layout pattern.

FIG. 6 shows an element evaluation value $g(i)$ which evaluates a corresponding product plate. As shown in FIG. 6, the grouping apparatus 10 stores the element evaluation value $g(i)$ in association with each product plate (i) ordered. Here, i represents an index, which is a non-negative integer, for identification of each product plate.

The element evaluation value $g(i)$ indicates a relative value in a group of ordered product plates. More specifically, the element evaluation value $g(i)$ is a small value when its corresponding product plate is more likely to be included in the layout patterns, and is a large value when its corresponding product plate is less likely to be included in the layout patterns.

Figure 7:
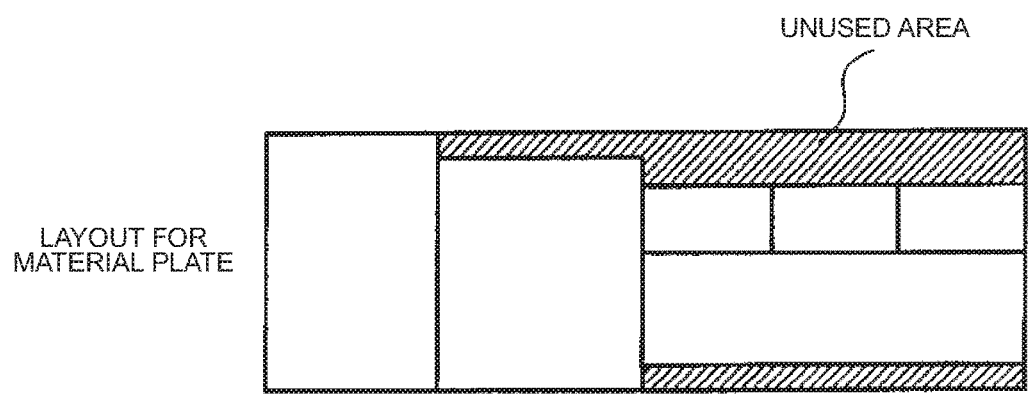
FIG. 7 shows an example of a group evaluation value f(p) for evaluating a layout pattern.

FIG. 7 shows an example of a group evaluation value f(p) which evaluates a corresponding layout pattern. The grouping apparatus 10 calculates the group evaluation value f(p) which evaluates a corresponding layout pattern to determine whether or not to register the layout pattern.

As shown in FIG. 7, for example, the group evaluation value f(p) is a value (yield rate) obtained by multiplying by 100 a ratio (filling ratio) of the area of a combined shape obtained by combining selected product plates (the size of the combined shape) to the area of the layout pattern (i.e., the set size of a material plate). In other words, the group evaluation value f(p) represents an index indicating whether or not product plates can be efficiently cut out from the layout pattern.

Then, as an example, the grouping apparatus 10 determines whether or not to register the layout pattern based on Formula (1) below using the element evaluation values g(i) and the group evaluation value f(p) described above.

[Expression 1]

$$(100 - f(p)) \leq (100 - a)\frac{1}{|p|}\sum_{i \in p} g(i) \quad (1)$$

In Formula (1), "a" is a constant, and indicates a preset target yield rate. For example, "a" indicates such a value as 99.98. In addition, in Formula (1), "|p|" indicates the number of product plates included in the layout pattern. Also, in Formula (1), the Σ-term indicates the total of the element evaluation values g(i) of the respective product plates included in the layout pattern.

In other words, Formula (1) is a formula for determining whether or not a value obtained by subtracting the group evaluation value f(p) from 100 (that is 100−f(p)) is equal to or smaller than a value obtained by multiplying a value obtained by subtracting the preset target yield rate from 100 (that is 100−a) by a mean value of the element evaluation values g(i) of the respective product plates included in the layout pattern. The grouping apparatus 10 registers the layout pattern when Formula (1) is satisfied, and does not register the layout pattern when Formula (1) is not satisfied.

Note that the group evaluation value f(p) can instead be, for example, a value (product loss rate) obtained by multiplying by 100 a ratio (loss ratio) of a loss area obtained by subtracting the area of a combined shape from the area of the layout pattern, to the area of the layout pattern. In this case, for example, the grouping apparatus 10 determines whether or not to register the layout pattern based on Formula (2) below.

[Expression 2]

$$f(p) \leq b \times \frac{1}{|p|}\sum_{i \in p} g(i) \quad (2)$$

In Formula (2), "b" is a constant and indicates a preset target product loss rate. The constant "a" in Formula (1) and the constant "b" in Formula (2) have a relation of "100−a=b." Values indicated by the "|p|" and Σ-term are the same as those in Formula (1).

In other words, Formula (2) is a formula for determining whether or not the group evaluation value f(p) is equal to or smaller than a value obtained by multiplying the preset target product loss rate (b) by a mean value of the element evaluation values g(i) of the respective product plates included in the layout pattern. The grouping apparatus 10 registers the layout pattern when Formula (2) is satisfied, and does not register the layout pattern when Formula (2) is not satisfied.

As described above, the grouping apparatus 10 determines whether or not to register a layout pattern based on the group evaluation value f(p) which is an index indicating efficiency of cutting out product plates from the layout pattern and also based on the element evaluation values g(i) of the respective product plates included in the layout pattern. Thus, the grouping apparatus 10 can be more likely to register a layout pattern including high-valued ones of the multiple product plates.

Figure 8:
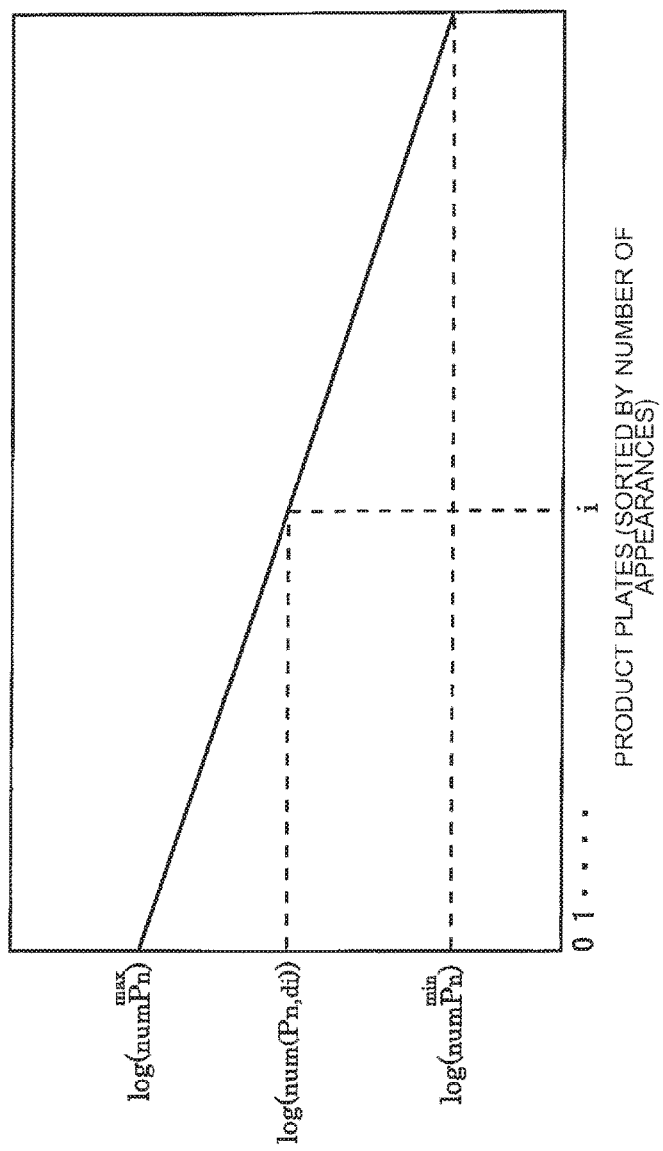
FIG. 8 shows an example of a graph representing the number of appearances of each product plate.
Figure 9:
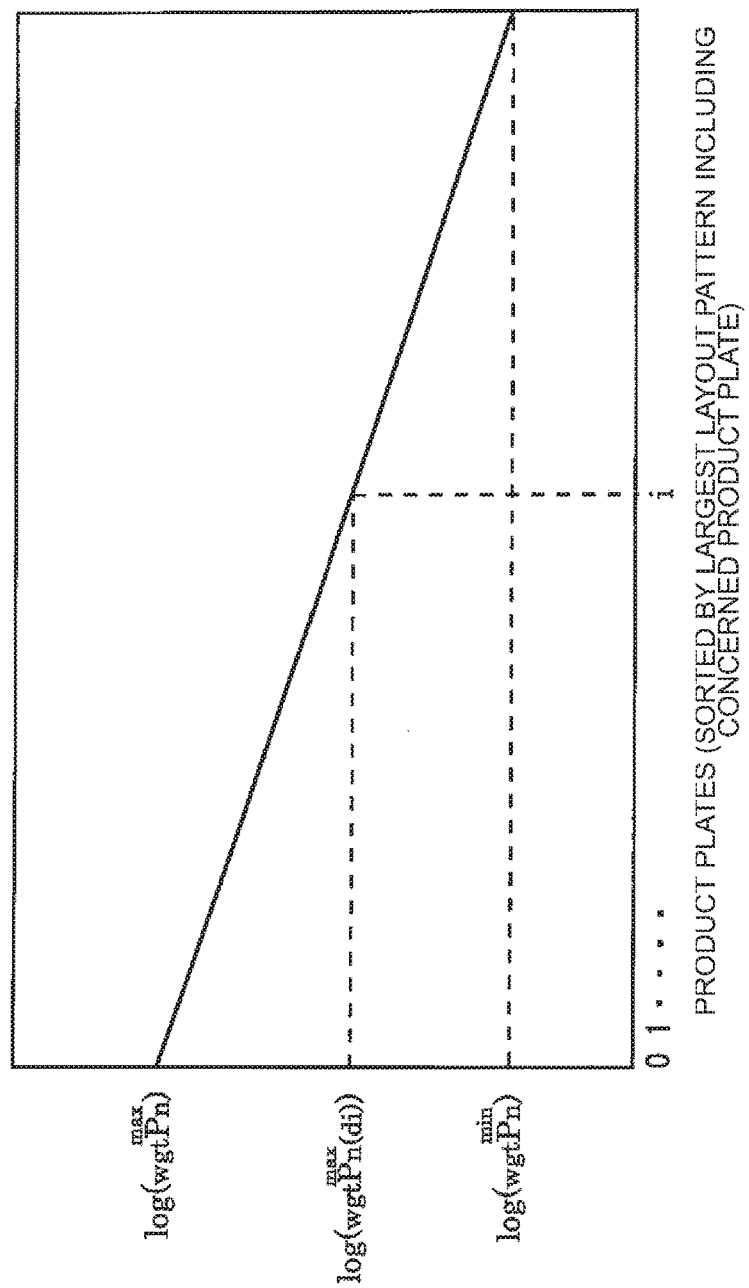
FIG. 9 shows an example of a graph representing, for each product plate, the largest one of layout patterns including the product plate.

FIG. 8 shows an example of a graph indicating the number of appearances of each of the product plates. FIG. 9 shows an example of a graph indicating, for each of the product plates, a largest layout pattern including the product plate.

Here, in a process of generating many layout patterns (e.g., several tens of thousands of layout patterns), the grouping apparatus 10 sequentially updates the element evaluation values g(i). As an example, every time a predetermined number of layout patterns are generated (e.g., every time 1000 layout patterns are generated), the grouping apparatus 10 evaluates the value of each of the product plates, and updates the element evaluation value associated with the product plate.

For example, in the layout pattern generating stage, initially, the grouping apparatus 10 assigns the same value to all the element evaluation values associated with the respective product plates. Then, in the process of generating many layout patterns, the grouping apparatus 10 assigns a smaller value to the element evaluation value associated with a product plate which is included in many of the already-generated layout patterns, and assigns a larger value to the element evaluation value associated with a product plate which is included in a few of the already-generated layout patterns.

Thus, the grouping apparatus 10 updates the element evaluation value g(i) of each of at least one element according to how many times the each element is included in the already-generated layout patterns, and reflects the updated value in the next layout generation.

As an example, the grouping apparatus 10 updates the element evaluation value g(i) of an index (i) by using Formula (3) below.

[Expression 3]

$$g_{n+1}(di) = g_n(di) \times \left(1 + \frac{g_n^{num}(di) + g_n^{wgt}(di)}{2}\right) \quad (3)$$

In Formula (3), the subscripted "n" indicates an integer which is 0 or larger, and indicates the number of updates of the element evaluation value. In Formula (3), "di" indicates the element (product plate) indicated by the index i.

Further, $g_n^{num}(di)$ is represented as in Formula (4) below. Moreover, terms in Formula (4) are represented as in Formula (5), Formula (6), and Formula (7).

[Expression 4]

$$g_n^{num}(di) = \frac{\log\left(num\overset{max}{Pn}\right) - \log(num(Pn, di))}{\log\left(num\overset{max}{Pn}\right) - \log\left(num\overset{min}{Pn}\right)} \quad (4)$$

$$num\overset{max}{Pn} = \max_{di \in D} num(Pn, di) \quad (5)$$

$$num\overset{min}{Pn} = \min_{di \in D} num(Pn, di) \quad (6)$$

$$num(Pn, di) = \sum_{p \in Pn} num(p, di) \quad (7)$$

As shown in FIG. 8, Formula (5) represents the number of appearances of a product plate which appears most in multiple layout patterns generated up to immediately before the n+1-th update is made. As shown in FIG. 8, Formula (6) represents the number of appearances of a product plate which appears least in the multiple layout patterns generated up to immediately before the n+1-th update is made. As shown in FIG. 8, Formula (7) represents the number of appearances of a product plate di indicated by the index i in the multiple layout patterns generated up to immediately before the n+1-th update is made. Pn indicates a group of layout patterns generated up to the point when the n-th update is completed. In Formula (7), num(p,di) indicates how many times the element (product plate) di is included in the layout patterns p∈P.

Thus, $g_n^{num}(di)$ in Formula (3) is a value from 0 to 1, inclusive, and is small for a product plate whose number of appearances is relatively large, and is large for a product plate whose number of appearances is relatively small, among multiple product plates.

Further, $g_n^{wgt}(di)$ in Formula (3) is represented as in Formula (8) below. Moreover, terms in Formula (8) are represented as in Formula (9), Formula (10), and Formula (11).

[Expression 5]

$$g_n^{wgt}(di) = \frac{\log\left(wgt\overset{max}{Pn}\right) - \log\left(wgt\overset{max}{Pn}(di)\right)}{\log\left(wgt\overset{max}{Pn}\right) - \log\left(wgt\overset{min}{Pn}\right)} \quad (8)$$

$$wgt\overset{max}{Pn} = \max_{di \in D}\left(wgt\overset{max}{Pn}(di)\right) \quad (9)$$

$$wgt\overset{min}{Pn} = \min_{di \in D}\left(wgt\overset{max}{Pn}(di)\right) \quad (10)$$

$$wgt\overset{min}{Pn}(di) = \max_{p=\{p|p \in Pn, num(p,di)>0\}} wgt(p) \quad (11)$$

As shown in FIG. 9, Formula (9) indicates the size of a largest layout pattern out of multiple layout patterns generated up to immediately before the n+1-th update is made. As shown in FIG. 9, Formula (10) indicates the size of a smallest layout pattern out of the multiple layout patterns generated up to immediately before the n+1-th update is made.

As shown in FIG. 9, Formula (11) indicates the size of the largest one of the layout patterns of material plates including the product plate indicated by the index i, in the multiple layout patterns generated up to immediately before the n+1-th update is made. The size of the layout pattern p is indicated by wgt(p).

Thus, $g_n^{wgt}(di)$ in Formula (3) is a value from 0 to 1, inclusive, and a product plate is assigned a small $g_n^{wgt}(di)$ when the largest one of layout patterns including the product plate is relatively large, and is assigned a large $g_n^{wgt}(di)$ when the largest one of layout patterns including the product plate is relatively small.

As described above, according to Formula (3), an element evaluation value $g_n(di)$ of a product plate indicated by the index i updated for the n+1-th time is generated by multiplying the element evaluation value $g_n(di)$ of the product plate updated for the n-th time by a coefficient $(1+(g_n^{num}(di)+g_n^{wgt}(di))/2)$ which is from 1 to 2, inclusive. By this coefficient, the element evaluation value $g_n(di)$ is made smaller for a product plate whose number of appearances is large and is made larger for a product plate whose number of appearances is small. Also, by this coefficient, the element evaluation value $g_n(di)$ is made smaller when the largest one of layout patterns including the product plate is relatively large, and is made larger when the largest one of layout patterns including the product plate is relatively small.

In this way, when generating many layout patterns, the grouping apparatus 10 can update the element evaluation value g(i) such that a high-valued product plate is assigned a relatively small value and that a less-valued product plate is assigned a relatively large value.

B in FIG. 10 shows an example of a graph line representing the number of appearances after completion of the n-th time update of each of product plates sorted by the number of appearances in a case where the element evaluation values are not updated. A in FIG. 10 shows an example of a graph line representing the number of appearances after completion of the n-th time update of each of the product plates sorted by the number of appearances in a case where the element evaluation values are updated.

As shown by the graph line B in FIG. 10, when the element evaluation values g(i) are not updated, the difference between the most-appearing product plate and the least-appearing product plate after completion of the n-th update processing is about 10,000 times, which is very large. As such, when a certain product plate is included in extremely few layout patterns, only a small number of combinations of multiple layout patterns including multiple product plates without duplication can be generated. As a result, the yield rate decreases, increasing the cost for manufacturing the product plates.

In contrast, as shown by the graph line A in FIG. 10, in the case where the element evaluation values g(i) are updated, the difference between the most-appearing product plate and the least-appearing product plate after completion of the n-th update processing is about 100 times, which is very small. In this way, the grouping apparatus 10 according to the embodiment can average the numbers of times the respective multiple product plates are included in multiple layout patterns.

Thus, the grouping apparatus 10 can increase the number of combinations of multiple layout patterns including multiple product plates without duplication. As a result, the grouping apparatus 10 can make the yield rate better to decrease the cost for manufacturing the product plates.

FIG. 11 shows an example of the hardware configuration of a computer 1900 according to the embodiment. The computer 1900 according to the embodiment includes: a CPU periphery unit having a CPU 2000, a RAM 2020, and a graphic controller 2075 which are connected to one another via a host controller 2082, as well as a display device 2080; an I/O unit having a communication interface 2030, a hard disk drive 2040, and a CD-ROM drive 2060 which are connected to the host controller 2082 via an I/O controller 2084; and a legacy I/O unit having a ROM 2010, a flexible drive 2050, and an I/O chip 2070 which are connected to the I/O controller 2084.

The host computer 2082 connects the RAM 2020 to the CPU 2000 and the graphic controller 2075 which access the RAM 2020 at a high transmission rate. The CPU 2000 operates based on programs stored in the ROM 2010 and the RAM 2020, and thus controls each unit. The graphic controller 2075 acquires image data generated by the CPU 2000 or the like on a frame buffer provided in the RAM 2020, and displays the image on the display device 2080. Instead of this, the graphic controller 2075 itself can include the frame buffer to store the image data generated by the CPU 2000 or the like.

The I/O controller 2084 connects the host controller 2082 to the communication interface 2030, the hard disk drive 2040, and the CD-ROM drive 2060 which are I/O devices operating at a relatively high speed. The communication interface 2030 allows communication with other devices via a network. The hard disk drive 2040 stores programs and data, in the computer 1900, used by the CPU 2000. The CD-ROM drive 2060 reads a program or data from a CD-ROM 2095 and provides it to the hard disk drive 2040 via the RAM 2020.

Further, the I/O controller 2084 is connected to the ROM 2010 as well as to the flexible disk drive 2050 and the I/O chip 2070 which are I/O devices operating at a relatively low speed. The ROM 2010 stores a boot program executed by the computer 1900 upon activation and/or programs and the like dependent on the hardware of the computer 1900. The flexible drive 2050 reads a program or data from a flexible disk 2090, and provides it to the hard disk drive 2040 via the RAM 2020. The I/O chip 2070 connects the flexible disk drive 2050 to the I/O controller 2084, and also connects various I/O devices to the I/O controller 2084 via, for example, a parallel port, a serial port, a keyboard port, a mouse port, and the like.

The program provided to the hard disk drive 2040 via the RAM 2020 is stored in a recording medium such as the flexible disk 2090, the CD-ROM 2095, or an IC card, and is provided by a user. The program is read from the recording medium, installed on the hard disk drive 2040 in the computer 1900 via the RAM 2020, and executed by the CPU 2000.

Programs installed on the computer 1900 to cause the computer 1900 to function as the grouping apparatus 10 includes a group generation module and a group selection module. These programs or modules work on the CPU 2000 or the like to make the computer 1900 function as the group generator 12 and the group selector 14.

When information processing described in these programs are read by the computer 1900, the computer 1900 function as the group generator 12 and the group selector 14 which are concrete means implemented by collaboration of software and the various hardware resources described above. Then, these concrete means implement computation or processing on information according to the intended purpose of the computer 1900 in the embodiment, and thereby construct the unique grouping apparatus 10 according to the intended purpose.

As an example, in order for the computer 1900 to communicate with an external device or the like, the CPU 2000 executes a communication program loaded on the RAM 2020, and based on the processing contents described in the communication program, instructs the communication interface 2030 to perform communication processing. Controlled by the CPU 2000, the communication interface 2030 reads transmit data stored in a transmit buffer or the like provided on the storage device such as the RAM 2020, the hard disk drive 2040, the flexible disk 2090, or the CD-ROM 2095, and sends the transmit data to the network. The communication interface 2030 also writes receive data received from the network onto a receive buffer area provided on the storage device, or the like. In this way, the communication interface 2030 can transfer the transmit and receive data to and from the storage device using a DMA (direct memory access) method. Alternatively, the transmit and receive data can be transferred such that the CPU 2000 reads data from the storage device or communication interface 2030 of a transfer source, and writes the data onto the communication interface 2030 or storage device of a transfer destination.

Moreover, the CPU 2000 reads all or necessary part of files, databases, or the like stored in the external storage device such as the hard disk drive 2040, the CD-ROM drive 2060 (the CD-ROM 2095), or the flexible disk drive 2050 (the flexible disk 2090), onto the RAM 2020 using the DMA transfer or the like, and performs various kinds of processing on the data on the RAM 2020. Then, the CPU 2000 writes the processed data back onto the external storage device using the DMA transfer or the like. In such processing, the RAM 2020 can be regarded as being configured to temporarily hold the contents of an external storage device; therefore, the RAM 2020, the external storage device, and the like are collectively called a memory, a storage unit, a storage device, or the like in the embodiment. Various pieces of information such as various programs, data, tables, and databases in the embodiment are stored in such a storage device, and are targeted for information processing. Note that the CPU 2000 can also hold part of data in the RAM 2020 in a cache memory, and perform reading and writing on the cache memory. In such a mode, playing part of the function of the RAM 2020, the cache memory is also included in the RAM 2020, memory, and/or storage device unless it is shown separately.

Further, on data read out from the RAM 2020, the CPU 2000 performs the various kinds of processing described in the embodiment, including various computations, information processing, condition satisfaction determination, information search or replacement, and the like specified by a sequence of instructions in a program, and writes the processed data back onto the RAM 2020. For example, in performing the condition satisfaction determination, the CPU 2000 determines whether the various variables shown in the embodiment satisfy a condition, such as larger, smaller, equal or larger, equal or small, or equal after comparison with other variables or constants. When the condition is satisfied (or not satisfied), the sequence of instruction branches off to a different sequence of instructions or calls subroutine.

In addition, the CPU 2000 can search for a file in the storage device or information stored in a database or the like. For example, in a case where the storage device stores multiple entries in which attribute values of a first attribute are associated with respective attribute values of a second attribute, the CPU 2000 can search the multiple entries stored in the storage device to find an entry having an attribute value of the first attribute which matches a designated condition, and reads an attribute value of the second attribute stored in that entry. In this way, the CPU 2000 can acquire the attribute value of the second attribute associated with the first attribute satisfying the certain condition.

The programs or modules described above can be stored in an external recording medium. In addition to the flexible disk 2090 and the CD-ROM 2095, an optical recording medium such as a DVD or a CD, a magnetooptical recording medium such as an MO, a tape medium, and a semiconductor memory such as an IC card can be used as the recording medium. Also, a storage device, such as a hard disk or a RAM, provided to a server system connected to a dedicated communication network or the Internet can be used as the recording medium, and the programs can be provided to the computer 1900 via the network.

Although the present invention has been described above by use of the embodiment, the technical scope of the present invention is not limited to the scope described by the above embodiment. It is apparent to those skilled in the art that various modifications and improvements can be made to the above embodiment. It is apparent from descriptions of the claims that a mode thus modified or improved can also be included in the technical scope of the present invention.

The order in which each processing in operations, procedures, steps, stages, and the like of the device, system, program, and method described in the claims, the description, and the drawings is executed is not particularly stated with phrases such as "before" and "prior to." It should be noted that the processing can be implemented in any order unless an output of previous processing is used in later processing. Even though phrases such as "first" and "next" are used in descriptions for convenience in the operation flows in the claims, the description, and the drawings, this does not mean that they have to be implemented in that order.

I claim:

1. A computer-implemented method of determining a layout of a plurality of product plates of various sizes on multiple material plates, the computer-implemented method comprising the steps of:
    generating a plurality of layout patterns each including at least one of the plurality of product plates to be cut from a material plate, the generating comprising:
        selecting, by a computer, at least one candidate product plate from the plurality of product plates as a candidate to be included in a layout pattern;
        determining, by the computer, whether or not to generate the layout pattern including the selected at least one candidate product plate, based on a product plate evaluation value associated with each of the at least one candidate product plates selected in the selecting step, the product plate evaluation value indicating a number of times the product plate has been included in previously-generated layout patterns;
        provided that a determination is made to generate the layout pattern in the determining step, generating, by the computer, the layout pattern including the at least one candidate product plate selected in the selecting step;
        updating the product plate evaluation value of each of the at least one product plate selected for use in a next layout pattern generation; and
    selecting a plurality of layout patterns including all the plurality of product plates without duplication from the plurality of layout patterns generated in the layout pattern generating step.

2. The method according to claim 1, wherein updating the product plate evaluation value of each of the at least one product plate comprises: updating, by the computer, the product plate evaluation value of each of the at least one product plate to a larger value as the number of times each product plate is included in a plurality of already-generated layout patterns becomes smaller.

3. The method according claim 1, wherein
in the product plate selecting step, the computer selects at least one candidate product plate from the plurality of product plates of various sizes so that a combined size of the at least one candidate product plate is within a predetermined set size, and
in the determining step, the computer determines whether or not to generate the layout pattern based on a layout pattern evaluation value which depends on a filling ratio indicating a ratio of a combined size of the combined at least one candidate product plate selected in the product plate selecting step, to the set size.

4. The method according to claim 3, wherein
in the determining step, the computer determines whether or not to generate the layout pattern based on the layout pattern evaluation value and a mean value of the product plate evaluation value of the at least one candidate product plate selected in the product plate selecting step.

5. The method according to claim 4, wherein
in the determining step, the computer determines to generate the layout pattern, provided that a value obtained by multiplying the mean value by a preset percentage is equal to or larger than the layout pattern evaluation value which is based on a loss ratio indicating a ratio of a size obtained by subtracting the combined size from the set size, to the set size.

6. The method according to claim 3, wherein
in the product plate selecting step, the computer changes the set size within a predetermined limit and selects the at least one candidate product plate so that the combined size of the at least one candidate product plate is within the set size, and
in the updating step, the computer updates the product plate evaluation value of each of the at least one product plate according to how many times the each product plate is included in the plurality of already-generated layout patterns and to a largest set size among at least one layout pattern including the each product plate.

7. The method according to claim 3, wherein
the product plate selecting step further includes the steps of:
    selecting, by the computer, the at least one candidate product plate to be included in a group from the plurality of product plates while allowing the same product plate to be selected duplicately for two or more of the already-generated layout patterns.

8. The method according to claim 7, wherein
the layout pattern selecting step selects, from the plurality of layout patterns generated in the layout pattern generating step, the plurality of layout patterns which include all the plurality of product plates without duplication and minimize a total of the set size used to select the candidate product plate.

9. The method according to claim 7 further comprising the step of causing the computer to generate a layout pattern including a single product plate for at least part of the plurality of product plates, wherein
the layout pattern selecting step selects, from the plurality of layout patterns generated in the layout pattern generating step and in the single-element-group generating step, the plurality of layout patterns which include all the plurality of product plates without duplication.

10. The method according to claim 1, wherein the plurality of product plates are of various rectangular shapes and the material plates have rectangular set shapes so that the plurality of elements of various shapes are all included in a plurality of predetermined set shapes without duplication.

11. The method according to claim 1, wherein in the product plate selecting step, the computer generates layout patterns by connecting the plurality of product plates together in a reverse procedure to a procedure for cutting out the product plates from the material plates.

12. A computer readable storage medium tangibly embodying a computer readable program code having computer readable instructions which, when implemented, cause a computer to carry out the steps of a method of determining a layout of a plurality of product plates of various sizes on multiple material plates, the computer readable instructions comprising:
  instructions for generating a plurality of layout patterns each including at least one of the plurality of product plates to be cut from a material plate, the generating comprising:
    selecting, by a computer, at least one candidate product plate from a plurality of product plates as a candidate to be included in a layout pattern;
    determining, by the computer, whether or not to generate the layout pattern including the at least one candidate product plate selected in the selecting step, based on a product plate evaluation value associated with each of the at least one candidate product plates selected in the selecting step, the product plate evaluation value indicating a number of times the product plate has been included in previously-generated layout patterns;
    provided that a determination is made to generate the layout pattern in the determining step, generating, by the computer, the layout pattern including the at least one candidate product plate selected in the selecting step;
    updating, by the computer, the product plate evaluation value of each of the at least one product plate selected for use in a next layout pattern generation; and
    selecting a plurality of layout patterns including all the plurality of product plates without duplication from the plurality of layout patterns generated in the layout pattern generating step.

13. The computer readable storage medium according to claim 12, wherein said updating the product plate evaluation value of each of the at least one product plate comprises: updating, by the computer, the product plate evaluation value of each of the at least one product plate to a larger value as the number of times each product plate is included in a plurality of already-generated layout patterns becomes smaller.

14. The computer readable storage medium according claim 12, wherein
  in the product plate selecting step, the computer selects at least one candidate product plate from the plurality of product plates of various sizes so that a combined size of the at least one candidate product plate is within a predetermined set size, and
  in the determining step, the computer determines whether or not to generate the layout pattern based on a layout pattern evaluation value which depends on a filling ratio indicating a ratio of a combined size of the combined at least one candidate product plate selected in the product plate selecting step, to the set size.

15. The computer readable storage medium according to claim 14, wherein
  in the determining step, the computer determines whether or not to generate the layout pattern based on the layout pattern evaluation value and a mean value of the product plate evaluation value of the at least one candidate product plate selected in the product plate selecting step; and wherein
  in the determining step, the computer determines to generate the layout pattern, provided that a value obtained by multiplying the mean value by a preset percentage is equal to or larger than the layout pattern evaluation value which is based on a loss ratio indicating a ratio of a size obtained by subtracting the combined size from the set size, to the set size.

16. An apparatus for determining a layout of a plurality of product plates of various sizes on multiple material plates, the apparatus comprising:
  a processor and a memory coupled to the processor, wherein the memory comprises instructions which, when executed by the processor, cause the processor to:
    generate a plurality of layout patterns each including at least one of the plurality of product plates to be cut from a material plate, wherein to generate the plurality of layout patterns said processor is further configured to:
    select at least one candidate product plate from the plurality of product plates as a candidate to be included in a layout pattern;
    determine whether or not to generate the layout pattern including the at least one candidate product plate selected based on each product plate evaluation value associated with the at least one candidate product plate selected, the product plate evaluation value indicating a number of times the product plate has been included in previously-generated layout patterns;
    generate the layout pattern including the at least one candidate product plate selected provided that processor makes a determination to generate the layout pattern;
  update the product plate evaluation value of each of the at least one product plate selected for use in a next layout pattern generation; and
  select a plurality of layout patterns including all the plurality of product plates without duplication from the plurality of layout patterns generated in the layout pattern generating step.

17. The apparatus according to claim 16, wherein to update the product plate evaluation value of each of the at least one product plate, said processor is further configured to: update the product plate evaluation value of each of the at least one product plate to a larger value as the number of times each product plate is included in a plurality of already-generated layout patterns becomes smaller.

18. The apparatus according claim 16, wherein
  to select the product plate, the processor selects at least one candidate product plate from the plurality of product plates of various sizes so that a combined size of the at least one candidate product plate is within a predetermined set size, and
  the processor determines whether or not to generate the layout pattern based on a layout pattern evaluation value which depends on a filling ratio indicating a ratio of a combined size of the combined at least one candidate product plate selected in the product plate selecting step, to the set size.

19. The apparatus according to claim 18, wherein the processor is further configured to:
  determine whether or not to generate the layout pattern based on the layout pattern evaluation value and a mean value of the product plate evaluation value of the at least one candidate product plate selected in the product plate selecting step; and
  generate the layout pattern, provided that a value obtained by multiplying the mean value by a preset percentage is equal to or larger than the layout pattern evaluation value which is based on a loss ratio indicating a ratio of a size obtained by subtracting the combined size from the set size, to the set size.

* * * * *